3,448,075
Patented June 3, 1969

3,448,075
FIRE RETARDANT URETHANE COMPOSITIONS
Charles C. Clark, Kenmore, and Arthur J. Krawczyk, Cheektowaga, N.Y., assignors to Textron, Inc., a corporation of Rhode Island
No Drawing. Continuation-in-part of applications Ser. No. 455,645, May 13, 1965, and Ser. No. 478,410, Aug. 9, 1965. This application Oct. 21, 1965, Ser. No. 500,310
The portion of the term of the patent subsequent to Jan. 23, 1985, has been disclaimed
Int. Cl. C08f 45/54; C08g 51/54; C09d 5/18
U.S. Cl. 260—45.85         11 Claims

---

ABSTRACT OF THE DISCLOSURE

Intumescent fire retardant coating compositions are obtained. The coatings are moisture-curing urethanes of aromatic diisocyanates and one or more polyhydric alcohols. To provide the desired fire retardant and intumescent properties the coating compositions have incorporated therein a haloalkyl phosphate and an alkylene diamine tetra-acetic acid. For example, the coating compositions can contain ethylene diamine tetra-acetic acid and 2-chloroethyl phosphate.

---

This application is a continuation-in-part of applications Ser. No. 455,645, filed May 13, 1965 now Patent No. 3,365,420, and Ser. No. 478,410, filed Aug. 9, 1965.

This invention relates to fire retardant coating compositions. More particularly, the present invention is concerned with fire retardant coating compositions made by reaction of aromatic diisocyanates and one or more polyhydric alcohols. The coating compositions contain a haloalkyl phosphate and an alkylene diamine tetra-acetic acid. Coatings produced from the compositions of this invention are moisture-curing due to the presence of isocyanate groups and the coatings are especially distinguished by their intumescent properties.

The importance of imparting fire retardant characteristics to building materials and other substrates of the flammable type is widely recognized. By and large it is not practical, even if possible, to make flammable building materials completely fire resistant. However, it is very desirable to give to such materials sufficient fire retardant properties to delay the spread of fire to allow the escape of occupants from burning structures and to give time for firemen to arrive on the scene to take action before the structure is consumed and the fire transferred to nearby buildings and equipment. A most convenient manner of imparting such characteristics to the building materials is to coat them with a liquid which will cure or dry to a more or less hard film in the presence of the moisture in the atmosphere. These coating materials often have as a principal ingredient a base which is referred to as a moisture-curing vehicle. Such products are applied to plywood and other types of paneling and combustible materials used in forming walls and other structures in commercial and domestic buildings.

There are several ways in which the fire retardant properties of building materials may be evaluated. There has been adopted a test procedure designated ASTM E–84 in ASTM Standards 1961, Part 5, p. 1178, Surface Burning Characteristics of Building Materials. This test serves to classify building materials as to their burning characteristics and to provide data regarding (1) flame spread; (2) fuel contributed; and (3) density of smoke developed during exposure to fire. The material tested is given a comparative rating with the properties of red oak serving to indicate a value of 100 in all three of the categories while asbestos-cement board is assigned a 0 rating in each instance. This test is very severe and there is great difficulty in providing sufficient resistance to burning with respect to the wide variety of building materials, especially if the cost is to be kept within practical limits and the other desirable properties of the materials are not to be unduly deleteriously affected.

Another procedure for evaluating the fire retardant properties of building materials can be readily applied in the ordinary laboratory. This operation employs a small metal cabinet described in ASTM D1360 found in ASTM, Part 21, January 1965, Fire Retardancy of Paints (Cabinet Method), the cabinet having a glass door for observing burning in the cabinet. The cabinet also has holes around its bottom for air draft with a chimney serving as a smoke outlet. A 12" x 6" x ¼" wood panel, for instance, poplar, or even birch plywood for a more rigorous test, is covered with the coating to be tested and then the coating is allowed to dry or cure for at least about two days. Two or three coats may be applied and three coats give good film thickness for an adequate determination of fire retardance and intumescence. The coated panel is placed on a metal frame at a 45° angle in the test cabinet. A measured amount of ethanol, for instance, 1 cc. or even 5 cc. for a more severe test, is placed in a small iron cup below the panel, so that when the ethanol is burned the flame impinges against the underside of the panel. In the test the ethanol is ignited and allowed to burn out and the degree of burning of the panel and amount of intumescence are observed during burning and also when burning is finished.

The present invention provides a normally liquid, moisture-curing coating material or vehicle which when applied to a flammable building material or other combustible substrate, especially wood, imparts thereto outstanding resistance to burning in terms of flame spread and fuel contributed. The coatings may also have good stability, hardness and flexibility upon drying. The coatings have these properties as a result of a selection of the ingredients of the vehicle which also serve at least in substantial part to provide desirable fire retardant properties through intumescent action. Thus, our compositions are made by reaction of aromatic hydrocarbon diisocyanates and urethane-forming polyhydric alcohols. The compositions of the present invention not only exhibit intumescence, but in addition, they do not contribute to burning, rather they serve to prevent the spread of flames and in effect extinguish the burning of the substrate.

One ingredient of the coating composition of the present invention is an aromatic hydrocarbon diisocyanate and one or more of a variety of diisocyanates may be employed. The aromatic diisocyanates have a total of two isocyanate groups attached to one or two aromatic rings. The isocyanates may be substituted with non-interfering groups, such as aliphatic hydrocarbon radicals, e.g., lower alkyl groups. Suitable diisocyanates include 2,6-tolylene diisocyanate, 2,4-tolylene diisocyanate, p-phenylene diisocyanate, p,p'-diphenylmethane diisocyanate, 1,5-naphthylene diisocyanate, substituted aromatic diisocyanates, etc. The hydrocarbon portion of the diisocyanate has at least about 6 carbon atoms and usually does not have more than about 24 carbon atoms. Aromatic diisocyanates of 6 to 12 carbon atoms in the hydrocarbon group are preferred. The amount of diisocyanate component employed is such as to give a ratio of isocyanate groups to hydroxyl radicals of about 1.5 to 2.5:1, preferably about 1.8 to 2.2:1, based on the total of the diisocyanate and polyhydric alcohol reacted. The reaction mixture contains an excess of isocyanate groups sufficient to provide a moisture-curing vehicle. The isocyanate groups in the vehicle, aside from any unreacted diisocyanate present, are generally at least about 0.1 weight percent of the composition, e.g., up to about 20 percent, with about 0.5 to 10 percent being preferred.

The second essential component of the fire retardant and intumescent coating composition of the present invention is one or more polyhydric alcohols, especially diols alone or mixed with triols. The polyol may be selected from a wide variety of polyhydroxyl materials which may be aliphatic, including cycloaliphatic, aromatic or mixed aliphatic-aromatic hydrocarbon compounds, including substituted hydrocarbon compounds. Thus, the polyol may be alkyl, alkenyl, aryl, alkaryl, arylalkyl, etc., and will often have a molecular weight up to about 3000, but preferably has up to about 18 carbon atoms. Representative polyol classes and individual compounds are given below.

The polyol may be a phenoxy ether diol, especially a polyhalo-substituted phenoxy ether diol. These materials can be made, for example, from chlorodihydroxy alkanols through reaction with a suitable sodium polyhalophenate. The phenoxy ether diols can be represented by the formula:

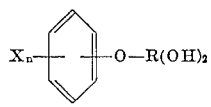

in which is halogen having an atomic number from 17 to 35, that is, chlorine or bromine and $n$ is a number from 0 to 5, preferably 2 or even 3 to 5. Also in the formula, R is a divalent alkyl, including cycloalkyl, radical of 3 to 12 carbon atoms, preferably 3 to 6 carbon atoms. The preferred polyhalophenoxy ether diol is pentachlorophenoxy glyceryl ether which has the structure

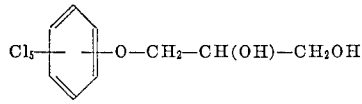

however, other suitable and similar materials may be employed. The phenyl group of these compounds may be substituted, e.g., with lower alkyl groups, and the compounds may also contain other non-interfering substituents. It is preferred that the two illustrated hydroxy groups of this reactant be attached to separate secondary and primary carbon atoms. Also the alkyl radical R may have its carbon-to-carbon chain interrupted as with one or more oxygen atoms. Representative reagents of this type include, for instance, phenoxyglyceryl ether, 2,4,6-trichlorophenoxy glyceryl ether, 1-tetrabromotoloxy-3,4-dihydroxy butane, 1-pentachlorophenoxy-2,6-dihydroxyhexane, etc.

The polyhydric alcohol employed in making the polyurethane-type reaction product of the present invention may be one or more aliphatic polyols, e.g., polyhydric alkanol, which can be the only polyol used or other polyols may also be employed with the aliphatic polyols, e.g., the phenoxy ether diols previously described. The aliphatic polyols have at least 2 carbon atoms, and among the wide variety of such materials which can be used are those represented by the formula:

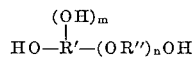

in which R' is an aliphatic hydrocarbon radical, preferably saturated, and R'' is an alkylene radical of 2 to 4, preferably 2 to 3 carbon atoms, R' generally has 2 to 12, preferably 2 to 6 carbon atoms. The letter $n$ represents a number from 0 to about 50, preferably 2 to 30, for more flexible coatings, while the letter $m$ is 0 to 1, preferably 0. When $n$ is other than 0, R' will often be the same as R''. The aliphatic polyol reactant can be substituted with non-deleterious substituents and the lower molecular weight polyether glycols, e.g., of 2 to 4 ethylene oxide units, are preferred reactant materials.

When both are used, the amounts of phenoxy diol and aliphatic polyol in the reaction product are often such as to give a weight ratio of these ingredients of about 1:10 to 10:1. Often these ratios are about 1:3 to 3:1, with ratios of the phenoxy diol to the aliphatic polyol of about 1.5 to 3:1 being a preferred form. Approximately equal molar ratios of these ingredients may often be employed.

Suitable aliphatic polyols include ethylene glycol, polyethylene glycols, for instance, of up to about 2000 molecular weight, propylene glycol, polypropylene glycols, for instance, of up to about 2500 molecular weight, trimethylol propane, trimethylol ethane, 1,6-hexamethylene glycol, 1,2,6-hexanetriol, etc. The aliphatic polyols of essentially dihydroxy functionality, i.e., where $m$ is 0, are preferred. Moreover, it is further preferred that the diol bear essentially no active hydrogen atoms other than those of the two hydroxyl groups.

Another polyol reactant which may be employed in making the polyurethane-type reaction product of the present invention is a polyhydroxyaliphatic ester of phosphorus, that is, the phosphates and phosphonates. These polyols may be employed along with one or more of the phenoxy ether diols and aliphatic polyols described above. The total number of carbon atoms in the three aliphatic groups of the ester is at least 3 and often does not exceed about 24, preferably not more than 18 with no one aliphatic group containing more than about 8 carbon atoms. The aliphatic radicals are often saturated and may be substituted, even with elements such as nitrogen and oxygen that interrupt the carbon chain. The polyol phosphorus esters may contain more than two hydroxyl groups but the diols are preferred.

Among the polyol esters of phosphorus which are useful in our invention are the phosphates and phosphonates of the formula:

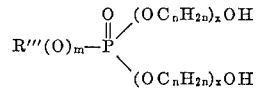

wherein $m$ is 0 to 1, $n$ is 2 to 6, especially 2 to 3, $x$ is 1 to 10, preferably 1 to 3, and R''' is an aliphatic, including cycloaliphatic, hydrocarbon radical, for instance of 1 to 8 carbon atoms, and is preferably lower alkyl. R''' may be saturated or unsaturated and substituted, but the compound is dissimilar to the haloalkyl phosphate component of our compositions. Illustrative of these materials are di(trioxypropylene)-methyl phosphonate,

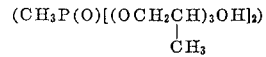

di[oxypropylene]butyl phosphate,

di[trioxyethylene]hydroxymethyl phosphonate

etc.

Diol phosphorus esters having one or more nitrogen atoms interrupting the carbon-to-carbon chain extending directly between terminal CH$_2$OH groups, can also be employed in this invention to provide the fire resistant and intumescent coatings. Thus, the diol may have the formula:

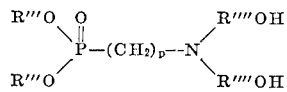

wherein $p$ is 1 to 4, R''' is as defined in the immediately preceding paragraph, and R'''' is a divalent radical of the same types as disclosed for R''', preferably lower alkylene, but with the OH groups shown. Compounds which exemplify this type of diol include O,O-diethyl-N,N-bis(2-hydroxyethyl)aminomethyl phosphonate,

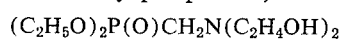

When both are used, the amounts of polyhydroxy aliphatic ester of phosphorus and other polyol in the reaction product are usually such as to give a weight ratio of these ingredients of about 1:10 to 10:1. Often these ratios are about 1:3 to 3:1, with ratios of the other polyol to the phosphorus ester of about 1.3 to 3:1 being a preferred form. Approximately equal molar ratios of these ingredients are often used.

The normally liquid polyurethane-type reaction product of the present invention containing a plurality of polyols such as the phenoxy ether diols and a dissimilar polyol, e.g., aliphatic polyol, polyhydroxy phosphorus ester, etc., can be made by simultaneous reaction of the diisocyanate and the polyols. Alternatively, the diisocyanate can be reacted with part or all of one or more of the polyols prior to reaction with the remaining portion of these materials. Stepwise mixing of the diisocyanate with the polyols is preferred to enhance temperature control. The reaction temperatures for making the various urethanes of the present invention are often in the range of about 40 to 130° C., with about 50 to 110° C. being preferred; and the reaction is preferably continued until there is essentially little, if any, unreacted hydroxyl functionality remaining.

The reaction product of the present invention is commonly prepared in the presence of an essentially inert solvent. The solvent serves to insure that the reactants are in the liquid state and the solvent enables better temperature control during the reaction by serving as a heat sink and, if desired, as a refluxing medium. Various solvents including mixtures of such materials may be employed and among the useful solvents are aromatic hydrocarbons, esters, ethers, ester-ketones, chlorinated hydrocarbons, etc. Frequently, the solvents are volatile materials which will be removed from the composition while it cures as a coating or film and in such case, there may be no need to remove any portion of the solvent from the reaction product prior to application as a coating. The solvent may be a relatively non-volatile material and may be selected with a view to improving the fire retardant properties of the coating, for instance, when chlorinated hydrocarbons are used. If the solvent is to be removed from the reaction product before it is applied as a film, the removal should be done in the absence of significant moisture, since moisture causes curing of the composition. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often we use about 0.25 to 6 weights of solvent, preferably about 0.5 to 3 weights of solvent, per weight of the total isocyanate and polyol. Among the suitable normally liquid solvents are xylene, ethylene glycol ethyl ether acetate, 1,1,1-trichloroethane, dimethylformamide, dimethylsulfone, dioxane, etc. and their mixtures; and we prefer that the solvent not contain more than about 10 carbon atoms per molecule.

The compositions of the present invention have additional ingredients which impart desirable properties, i.e., the compositions have additive susceptibility. Thus, the desirable fire retardant and intumescent characteristics are afforded by the presence of a haloalkyl phosphate, preferably a tris(haloalkyl)phosphate. The halogen component of this phosphate has an atomic number from 17 to 35, that is chlorine or bromine, and preferably the alkyl is monohalo-substituted. Chlorine is the preferred halogen. The alkyl, including cycloalkyl, groups are preferably lower alkyl radicals and in general, alkyls of a lesser number of carbon atoms, e.g., 2 or 4, are preferred, as they have lower fuel and smoke potential. One or more of the alkyl radicals may be substituted with materials other than halogens and may have an interrupted carbon chain. The amount of haloalkyl phosphate in the composition is sufficient to have the desired effect and is often about 20 to 60, preferably about 25 to 50 weight percent on the basis of the diisocyanate-polyol combination and the haloalkyl phosphate. If desired, the haloalkyl phosphate can be added to the composition before or after reaction of the diisocyanate and polyol, but preferably the addition is after the reaction.

In order to provide the desired fire retardant and intumescent characteristics to the coating compositions of the present invention we also include an effective amount of a lower alkylene diamine tetra-acetic acid. The alkylene members may have 2 to 4 carbon atoms, and we prefer to use ethylene diamine tetra-acetic acid. Products containing both the diamine and the haloalkyl phosphate have outstanding fire retardant and intumescent characteristics. In general, the coating compositions will contain about 20 to 60 weight percent of the alkylene diamine tetra-acetic acid, preferably the amount is about 25 to 50 weight percent, on the basis of the polymer composed of diisocyanate and polyol, and the alkylene diamine tetra-acetic acid.

The diamine may not be soluble in the coating composition to the extent of diamine present and it is the therefore desirable to add the diamine as a finely divided material and disperse it throughout the composition. The compositions of the present invention which contain water-soluble forms of the lower alkylene tetra-acetic acid, for instance, ethylene diamine tetra-acetic acid when applied as coatings may be sensitive to water contact as would occur during washing or use in a humid atmosphere. To counteract this possible difficulty, we prefer that the flammable substrate for the coating be covered with the fire resistant and intumescent composition which contains both the halogenated alkyl phosphate and the lower alkylene diamine tetra-acetic acid and then cover such film with a similar coating material in which the latter component is omitted. The resulting films are resistant to water leaching and show good hardness and excellent fire retardance and intumescence.

Our coating compositions are normally applied to substrates as films of less than 10 mils thickness and can contain other additives to impart special properties such as plasticizers, etc. Also, the substrate for the coating may be specially treated materials, including flammable members impregnated with fire-resistant chemicals or coated with a sealant.

The following examples will serve to illustrate the present invention but should not be considered limiting.

EXAMPLE I

One hundred fifty grams (0.44 equivalent) of a 55.5 percent solution by weight in xylene of pentachlorophenyl glyceryl ether, 14 grams 0.45 equivalent) of ethylene glycol, 35 grams of ethylene glycol ethyl ether acetate (Cellosolve acetate) and 83 grams of xylene were charged to a flask that had a thermometer, a water trap, a reflux condenser, glass mantel heater, nitrogen inlet, and stirrer. This mixture was distilled to remove water under azeotropic conditions for two hours. After the mixture was dry, 157 grams (1.8 equivalents) of tolylene diisocyanate (80 percent 2,4 isomer and 20 percent 2,6 isomer) were added while stirring. The temperature rose rapidly from 28 to 89° C. due to the reaction for the formation of polyurethane. After 30 minutes from the addition of the tolylene diisocyanate the temperature was 100° C. It was maintained at this point for 1 hour and 45 minutes. A sample of this vehicle analyzed 6.03 percent NCO, 5.06 percent free tolylene diisocyanate, 66.1 percent nonvolatile or solids, 12 minus Gardner color and Z8+⅔ Gardner viscosity.

When this vehicle was blended with ½ part tris (2-chloroethyl) phosphate per part of solids by weight, it dried in 2¾ hours. When it was blended with this amount of phosphate ester and the same weight of ethylene diamine tetra-acetic acid, the resulting product dried in 3½ hours. Both of the vehicles gave moderately flexible films when brushed on birch plywood. The Sward hardness of the first vehicle in the dried film was 24 while that of the second was 35. The vehicle modified with tris (2-chloroethyl) phosphate showed good intumescence and fire retardance. The vehicle modified with tris (2-chloroethyl (phosphate and ethylene diamine tetra-acetic acid showed excellent intumescence and fire retardance.

EXAMPLE II

Forty-six grams (0.27 equivalent) of pentachlorophenoxy glyceryl ether, 19 grams triethylene glycol (0.26 equivalent) and 152 grams of 1,1,1-trichloroethane were placed in a glass reaction flask which has a thermometer for measuring the temperature of the reaction mixture, a stirrer, a glass mantel heater, a reflux condenser, a water trap and an inlet for nitrogen. The mixture was heated for one hour at 80° C. in order to azetrope off water and dry the mixture. The dried batch was then allowed to cool to room temperature when 87 grams (1.0 equivalent) of tolylene diisocyanate (80 percent 2,4 and 20 percent 2,6 isomer) were added. The temperature rose rapidly from 30 to 86° C. when the solvent refluxed from the condenser. The temperature was kept between 50 and 74° C. for 1½ hours when the batch was allowed to cool to room temperature. This vehicle analyzed 52.5 percent nonvolatile, 7.81 percent NCO, 5.39 percent free tolylene diisocyanate, S Gardner viscosity and 10½ Gardner color.

One-half part by weight of tris (2-chloroethyl) phosphate per part of vehicle solids and one percent of N-cocomorpholine based on vehicle solids were stirred into the batch. This vehicle dried in 7 hours to an uneven film on a glass plate or a Morest chart. When ½ part by weight of powdered ethylene diamine tetra-acetic acid per part of solids was whipped into this vehicle on a Waring Blendor, the resulting vehicle dried on a Morest chart in 7½ hours. The film produced had a Sward hardness of 41. The film on birch plywood of the vehicle containing added tris (2-chloroethyl) phosphate exhibited fair fire retardance and intumescence when burned in the test cabinet. The film on birch plywood of the vehicle containing added tris (2-chloroethyl) phosphate and ethylene diamine tetra-acetic acid showed excellent fire retardance and intumescence when burned in the test cabinet.

EXAMPLE III

A reaction flask was set up with a heating mantel, thermometer for measuring the temperature of the batch, reflux condenser, water trap, stirrer and inlet for gaseous nitrogen. There were charged to this flask 46 grams (0.25 equivalent) pentachlorophenoxy glyceryl ether, 19 grams (0.25 equivalent) triethylene glycol, 152 grams ethylene glycol ethyl ether acetate and 76 grams tris (2-chloroethyl) phosphate. Eighty-seven grams (1.0 equivalent) tolylene diisocyanate (80 percent, 2,4 and 20 percent 2,6 isomer) was added starting at 28° C. After 30 minutes when all of the tolylene diisocyanate had been added, the temperature was 32° C. Heat was applied in order to dissolve some undissolved pentachlorophenoxy glyceryl ether. The temperature rose during 1 hour and 35 minutes to 130° C. At 86° C., 1 hour and 15 minutes after beginning heating, 76 grams more of tris (2-chloroethyl) phosphate was added and stirred into the batch. After cooling to room temperature, the product analyzed 5.29 percent NCO, 1.60 percent free tolylene diisocyanate, Z7—1¼ Gardner viscosity and 8 plus Gardner color.

One percent of N-cocomorpholine was added to this vehicle. One-half part by weight of ethylene diamine tetra-acetic acid per part of urethane solids (76 grams) was whipped into the vehicle in a Waring Blendor. The resulting mixture was coated on birch plywood panels (12" x 6" x ¼") giving a fairly thick coating (about 8 mils) which dried in about 11 hours to a soft pliable film. This film when burned in the test cabinet exhibited excellent fire retardance and intumescence.

EXAMPLE IV

Two hundred eight grams (0.84 equivalent) of a 55.5 percent by weight solution in xylene of pentachlorophenoxy glyceryl ether, 61 grams (.06 equivalent) of polypropylene glycol of molecular weight about 2025, 35 grams of ethylene glycol ethyl ether acetate and 83 grams of xylene were placed in a reaction flask provided with thermometer, reflux condenser, water trap, stirrer, electric mantel heater and inlet for nitrogen. This mixture was heated for 2 hours at the temperature of distillation to azeotrope off water and dry the mixture. After cooling the mixture to room temperature, 157 grams (1.8 equivalent) of tolylene diisocyanate was added. The temperature of the batch rose rather rapidly to 86° C. The temperature was then raised to 100° C. for 1 hour and 10 minutes after which the batch was cooled to room temperature. Analysis gave the following values: Non-volatile 64.8 percent, NCO 4.00 percent, free tolylene diisocyanate 1.06 percent, Gardner viscosity Z6—⅙ and Gardner color 12 minus.

One percent of N-cocomorpholine and ½ part by weight of tris (2-chloroethyl) phosphate per part of vehicle solids were mixed into this vehicle. This product was found to dry on a Morest chart in 3 hours to a film having a Sward hardness of 20, two days after drying. The film so produced burned with considerable smoking on birch plywood and melted and ran down. When ½ part by weight of ethylene diamine tetra-acetic acid per part of urethane solids in the original vehicle was stirred into the vehicle containing catalyst and phosphate ester, it dried on a Morest chart in 3½ hours to a moderately flexible film. When a dried film of this vehicle was burned on birch plywood, it produced a moderate amount of smoke and showed fire retardance and intumescence.

EXAMPLE V

Fifty grams of solids of a clear polyurethane vehicle made by condensing approximately 1 part by weight triethylene glycol, 2.4 parts by weight pentachlorophenoxy glyceryl ether and 4.6 parts by weight tolylene diisocyanate (99 percent 2,4 and 1 percent 2,6 isomers) in equal parts by weight of xylene and Cellosolve acetate so as to prepare a prepolymer having a percent NCO of about 5.5 to 6, were mixed with 25 grams of tris (2-chloroethyl) phosphate and 25 grams of finely powdered ethylene diamine tetra-acetic acid which had previously been ground with the tris (2-chloroethyl) phosphate in a ball mill for several hours. One percent of N-cocomorpholine based on vehicle solids was added to this vehicle as a catalyst for its moisture cure. A typical analysis for this vehicle is NV 54, Viscosity A2, Color hazy, percent NCO 2.79, Free TDI 1.2.

Birch plywood boards, 12" x 6" x ¼" were coated with this vehicle at 3 coats (11 mils) and 2 coats (7 mils). This vehicle dried on these boards in about four hours at room temperature. After allowing these boards to cure for several days, they were burned in the test cabinet for evaluation of fire retardant vehicles using 1 cc. of absolute ethanol in the metal cup. The burned panels exhibited excellent intumescence and the plywood under the intumescent foam was scarcely burned. When this same vehicle without the ethylene diamine tetra-acetic acid as an ingredient was coated onto similar boards and burned in the test cabinet, fair intumescence was produced and some destruction of the ply just under the vehicle coating had occurred.

EXAMPLE VI

Fifteen hundred grams of pentachlorophenoxy glyceryl ether (PCP) was warmed to melt it and dissolve it in xylene solvent. The PCP content of the xylene-PCP solution was 55.5 percent. Three hundred thirty-six grams of triethylene glycol (TEG) was added to the 5 liter reaction flask which was provided with an electric mantle heater, a mechanical stirrer, an inlet for nitrogen, a thermometer, a reflux condenser and a trap for collecting water distilled from the system. This mixture was heated for one hour during which water was azeotroped and collected in the water trap. The dry mixture was poured into another vessel to be added later to the aromatic diisocyanate in solvent.

Three hundred fifty grams of Cellosolve acetate and 833 grams of xylene were added to the reaction flask and the mixture azeotroped for one hour at 140 to 150° C. to remove water. The solvents were then cooled to 100° C. Fifteen hundred sixty grams of tolylene diisocyanates (80 percent 2,4 and 20 percent 2,6 isomers) were added under nitrogen to the solvents. With the temperature at 100°±5° C. the previously dried PCP–TEG mixture was added in steps over one hour. One-fourth of the mixture was added at the end of each quarter hour period. A cooling mixture was applied to the reaction flask during the addition of the mixture of diols.

The following log illustrates the conditions used in this process:

| Time, Minutes | Temperature, °C. | Gardner Viscosity | NCO, percent | Gardner Color |
|---|---|---|---|---|
| 0 | | | | |
| 15 | 103 | A5 | 18.13 | 7+ |
| 30 | 103 | Z2+⅛ | 11.13 | 10− |
| 45 | 99 | T+¼ | 7.26 | 11− |
| 60 | 99 | Z−¼ | 5.95 | 11− |

The fact that the viscosity at 45 minutes was T+¼ may be explained by assuming that the addition of diols thinned the mixture and that the viscosity was measured before the newly added diols had reacted. After the reaction was complete, 1.4 grams of orthochlorobenzoyl chloride was added as a stabilizer at the beginning of the cooling cycle.

Analysis of the final vehicle after cooling showed NV 62.4, percent NCO 5.91, Viscosity Z+⅓, Gardner Color 11+, Free TDI 3.04% and Specific Gravity 1.1601.

EXAMPLE VII

The compositions of this invention have been tested by the ASTM E-84 procedure described above.

The following table gives some results of the test:

TABLE I

| Example V, Vehicle Type [1] | Film Thickness (mils dry film) | Flame Spread | Fuel Contributed | Smoke Developed |
|---|---|---|---|---|
| 1 | 4 | 60 | 30 | 105 |
| 1 | 6 | 55 | 20 | 130 |
| 1 | 4 | 45 | 20 | 115 |
| 2 | [2] 2 | | | |
| Asbestos Board | | 0 | 0 | 0 |
| Red Oak | | 100 | 100 | 100 |
| Douglas Fir | | 110 | | |

[1] Vehicle type 1 was prepared as in Example VI and vehicle type 2 was the same as vehicle type 1 without the ethylene diamine tetra-acetic acid.
[2] The film consisted of 4 mils of vehicle type 1 covered by 2 mils of vehicle type 2.

EXAMPLE VIII

In the following tests 12"x 6"x ¼" poplar boards were completely coated, three coats, 6 mils film with the coating of Example V prepared as in Example VI. Three days drying or curing were allowed between each coat. The coats were brushed on. Boards prepared in this manner were immersed in water at room temperature. They were removed at intervals and examined for appearance, intumescence and fire retardance. The following is a tabular summary of the results obtained.

TABLE II

| Run | Coating Example V [1] | Number Coatings | Immersion, Hours | Appearance | Hardness | Intumescence | Fire Retardancy |
|---|---|---|---|---|---|---|---|
| 1 | A | 3 | 8 | Slight Whitening | Good | | |
| 2 | {B on A} | {1, 2} | 8 | No Whitening | do | | |
| 3 | A | 3 | 24 | Slight Whitening | do | Excellent | Excellent. |
| 4 | {B on A} | {1, 2} | 24 | No Change | do | do | Do. |
| 5 | A | 3 | 48 | Distinct Whitening | do | do | Do. |
| 6 | {B on A} | {1, 2} | 48 | No Change | do | do | Do. |
| 7 | A | 3 | 168 | Very White | do | do | Do. |
| 8 | {B on A} | {1, 2} | 168 | No Change | do | do | Do. |
| 9 | A | 3 | 336 | Very White | do | do | Do. |
| 10 | {B on A} | {1, 2} | 336 | No Change | do | do | Do. |

[1] A, refers to the fully compounded coating including the chloroethyl phosphate and ethylene diamine tetra-acetic acid; B, refers to the same composition as A but without the ethylene diamine tetra-acetic acid.

The data of the table shows that coating A was subject to water spotting while a film of coating B on coating A was not. However, leaching of coating A was insufficient in the tests to give apparent harm to the coatings.

Also in another set of tests poplar panels 12"x 6"x ¼". were coated completely with three coats of A or with two coats, 4 mils of A, with one topcoat of B. These coatings were brushed on at the rate of 2 mils per coat. At least two days were allowed between coats for suitable curing. Panels were immersed for 24 hours at 120° F., then removed and air dried for 8 hours and finally dried for 24 hours in an oven at 120° F. All panels showed excellent intumescence and fire retardance. Adhesion and hardness were not altered by this treatment. This warm water leaching test is given in Interim Federal Specification for Paint, Interior, White and Tints, Fire Retardant, TT-P-0026b(DOD), Aug. 24, 1961.

EXAMPLE IX

Phenoxyglyceryl ether (33 grams, 0.38 equivalent), triethylene glycol (28.5 grams, 0.38 equivalent), Cellosolve acetate (64 grams) and xylene (64 grams) were charged to a glass flask provided with a thermometer, inlet for nitrogen, stirrer, water trap, reflux condenser and heating mantel. This mixture was boiled for an hour during which water and xylene were removed from the system. The mixture, after drying was completed, was cooled and 132 grams (1.52 equivalents) of tolylene diisocyanate (80 percent 2,4 and 20 percent 2,6 isomers) were added to it at 28° C. The temperature rose rapidly to 45° C. from the heat released by the reaction. Heat was then applied until the temperature of the reaction mixture reached 100° C. where it was kept throughout the preparation of the vehicle. The total heating time was 10¾ hours. At the end of this period, the percent NCO of the vehicle was 9.93.

The following analysis of the finished vehicle is given:

Non-volatile _____ percent__ 57.2
NCO _____ do____ 9.76
Free tolylene diisocyanate _____ do____ 4.13
Viscosity (Gardner) _____ C
Color (Gardner) _____ minus__ 1

A fire retardant vehicle at 55 non-volatile was prepared from the product by combining 100 grams of it with a composition made by grinding 28.6 grams of ethylene diamine tetra-acetic acid, 28.6 grams of tris(2-chloroethyl) phosphate, 25 g. of Cellosolve acetate and 25 grams of xylene together in a ball mill. N-cocomorpholine (0.57 gram) was dissolved in the resulting vehicle as a catalyst for curing.

This fire retardant vehicle was drawn down in a 3 mil film on a glass plate. This film dried in 2½ hours. The dried film had a Sward hardness of 28 after 1 week.

This vehicle was coated by brushing onto ¼" birch plywood to a dried film thickness of 6.5 to 7.5 mils. After allowing this film to cure for several days, it was subjected to burning in the cabinet test. It showed excellent intumescence and fire retardance.

Another vehicle was made from the original urethane of this example at 60 non-volatile using 100 grams of the urethane, 28.6 grams of tris(2-ethyl)phosphate, 7.1 grams of Cellosolve acetate, 7.1 grams xylene and 0.57 gram N-cocomorpholine curing catalyst. This vehicle dried in 2½ hours, showed a hardness on glass of 18 Sward after 1 week and exhibited fire retardancy and some intumescence when burned at 6 mils dried film on ¼" birch plywood in the cabinet test.

EXAMPLE X

Two hundred twenty-five grams (0.67 equivalent) of pentachlorophenyl glyceryl ether, 117 grams (0.67 equivalent) of di[oxypropylene]butyl phosphate, 53 grams of ethylene glycol ethyl ether acetate and 124 grams of xylene were charged to a glass flask provided with thermometer, reflux condenser, water trap, stirrer, glass mantel heater and inlet for gaseous nitrogen. This mixture was heated for 2 hours at about 130° C. during which solvent and water were distilled over by the azeotrope process. When the mixture was dry, as judged by no more water distilling over, the temperature was lowered to about 28° C. and 235 grams (2.68 equivalents) of tolylene diisocyanate (80 percent 2,4 and 20 percent 2,6 isomer) added to the flask. An exotherm occurred rapidly while stirring with the temperature rising to 35° C. The temperature was then raised by the application of heat to about 100° C. where it was kept for 6½ hours. After cooling the batch to room temperature, the product analyzed 7.11 percent NCO, 4.37 percent free tolylene diisocyanate, 62.2 percent non-volatile, 8 minus Gardner color and H Gardner viscosity.

This vehicle when catalyzed with 1 percent N-cocomorpholine based on non-volatile material dried in 3 hours giving a film possessing fair flexibility. When one percent of N-cocomorpholine based on solids and ½ part by weight of tris (2-chloroethyl) phosphate per part of solids of this vehicle were added to this vehicle, it dried in 5½ hours giving a fairly flexible film. When these same ingredients were added to the base vehicle along with ½ part of ethylene diamine tetra-acetic acid per part of solids, the resulting vehicle dried in 7 hours giving a film possessing a fair degree of flexibility. Sward hardness for the dried films of these three vehicles were, respectively, 64, 20 and 22.

The base vehicle itself when coated on birch plywood at about 6 mils dry film showed some fire retardance and intumescence. When ½ part by weight of tris (2-chloroethyl) phosphate was dissolved in the base vehicle and the resulting mixture was coated on birch plywood at about 6 mils dry film, intumescence and fire retardance were improved to fair. When this amount of phosphate ester and ½ part by weight of ethylene diamine tetra-acetic acid per part of vehicle solids was stirred into the mixture and coated on birch plywood at about 6 mils dry film, both intumescence and fire retardance were excellent.

EXAMPLE XI

The following chemicals were charged to a glass reaction flask equipped with a reflux condenser, water trap, thermometer, stirrer, heating mantel and inlet for nitrogen:

167 grams (0.5 equivalent) of a 55.5 percent solution of pentachlorophenoxy glyceryl ether in xylene
107 grams (0.84 equivalent) O,O-diethyl-N,N'-bis (2-hydroxyethyl)aminomethyl phosphonate
53 grams ethylene glycol ethyl ether acetate
124 grams xylene This mixture was heated for two hours to azeotrope off water and dry it. After drying and cooling to room temperature, 235 grams (2.68 equivalents) of tolylene diisocyanate (80 percent 2,4 and 20 percent 2,6 isomer) were added to the batch. The temperature rose rapidly to 91° C. Heat was applied and the temperature raised to 100° C. where it was maintained for 2½ hours. After cooling the product was placed in cans. It analyzed 7.61 percent NCO 7.60 percent free tolylene diisocyanate, 64.1 percent non-volatile, 12½ Gardner color and Z3+⅕ Gardner viscosity.

When one percent N-cocomorpholine catalyst based on non-volatile was added to this vehicle, it dried in 3½ hours to a somewhat brittle film having a hardness of 54 Sward. When burned, this film showed fair fire retardance and intumescence. With this same percent of catalyst and with ½ part by weight of tris (2-chloroethyl) phosphate per part of non-volatile added to the vehicle, it dried in 6 hours to a moderately brittle film having a Sward hardness of 27. When burned, this film exhibited fair fire retardance and intumescence. With this percent of catalyst and this percent of phosphate ester along with ½ part by weight of ethylene diamine tetra-acetic acid per part of non-volatile material the film dried in 6½ hours showing a Sward hardness of 24. When burned, this film showed excellent fire retardance and intumescence.

EXAMPLE XII

One hundred fourteen grams (1 equivalent) of bisphenol A [HOC₆H₄C(CH₃)₂C₆H₄OH] 75 grams (1 equivalent) of triethylene glycol, 185 grams of Cellosolve acetate (ethylene glycol ethyl ether acetate) and 185 grams of xylene were placed in a glass reaction flask having a stirrer, thermometer, inlet for supplying a blanket of gaseous nitrogen to the reaction mixture, reflux condenser, water trap and electric heating mantel. This mixture was heated and xylene and water distilled off until all water was removed from the system. Dry xylene in the amount removed from the reaction flask during the drying operation was returned to the flask. The reaction mixture was then cooled to 25° C. and 348 grams (4 equivalents) of a mixture of 80 percent by weight of 2,4 and 20 percent 2,6 tolylene diisocyanate added to it while stirring. This mixture was heated with stirring during about 23 hours at 70° to 80 °C. after which the product was cooled and bottled. It had a solids content of 65.7 percnt, a percent NCO of 12.98, a Gardner viscosity of I and a Gardner color of 3—.

To 100 grams of the above vehicle containing 65.7 grams of vehicle solids were added 32.9 grams of finely ground ethylene diamine tetra-acetic acid and 32.9 grams of tris (2-chloroethyl) phosphate. This mixture was stirred to achieve uniform consistency. N-cocomorpholine (0.66 gram or 1 percent of urethane solids) was also stirred into the mixture as a curing catalyst for this type of moisture curing urethane vehicle. A 6 mil dry coating of this fire retardant vehicle was placed on plywood. It dried in about 4 hours and gave a film showing a Sward hardness of 39 after several days. When this film was subjected to the ASTM–D1360 fire retardant test, it showed good intumescence and fire retardancy.

EXAMPLE XIII

One hundred twenty-five grams of completely hydrogenated bisphenol A (1 equivalent, 450 hydroxyl value), 75 grams triethylene glycol (1 equivalent), 180 grams Cellosolve acetate (ethylene glycol ethyl ether acetate)

and 180 grams of xylene were charged to a reaction flask provided with a stirrer, a reflux condenser, a water trap, an inlet for nitrogen, a thermometer and a heating mantel. This mixture was heated to remove water by distillation of xylene until water ceased collecting in the water trap. Three hundred forty-eight grams (4 equivalents) of a mixture of 80 percent by weight 2,4 and 20 percent 2,6 tolylene diisocyanate were added to the above dried mixture at 28° C. with stirring. An exothermic reaction occurred and the temperature of the reaction mixture rose to 70° C. during 15 minutes. The temperature of the reaction mixture was kept between 90° and 98° C. for 6¾ hours when the batch was poured into a storage container. Examination of the vehicle showed 57.7 percent non-volatile, 8.76 percent NCO, E+¼ Gardner viscosity and 3+ Gardner color.

Twenty-eight and nine-tenths grams of tris (2-chloroethyl) phosphate and this same weight of finely ground ethylene diamine tetra-acetic acid were stirred into 100 grams of the above urethane vehicle along with 25 grams of Cellosolve acetate and 25 grams of xylene. The fire retardant vehicle produced in this manner has a total solids content of 55 percent by weight. When applied in three coats on plywood at a total dry film thickness of 6 mils, the coating dried in 4 hours. This coating when exposed to flame in the standard ASTM–D1360 test cabinet exhibited excellent intumescence and fire retardance. The film had a Sward hardness of 51 and showed good resistance to yellowing on exposure to ultraviolet light.

We claim:

1. A normally liquid, moisture-curing aromatic hydrocarbon diisocyanate-polyol urethane coating composition having incorporated therein amounts sufficient to improve the fire retardant properties of a coating of said composition of each of tris (halogen lower alkyl) phosphate in which the halogen has an atomic number from 17 to 35 and alkylene diamine tetra-acetic acid, said alkylene group having 2 to 4 carbon atoms, said amount of halogen alkyl phosphate being about 20 to 60 weight percent based on the urethane and halogen alkyl phosphate, and said amount of alkylene diamine tetra-acetic acid being about 20 to 60 weight percent based on the urethane and alkylene diamine tetra-acetic acid.

2. The composition of claim 1 in which the halogen lower alkyl is monochloroalkyl of 2 to 3 carbon atoms.

3. The composition of claim 1 in which the urethane is a tolylene diisocyanate-polyol urethane and the alkylene diamine tetra-acetic acid is ethylene diamine tetra-acetic acid.

4. The composition of claim 3 in which the phosphate is tris (chloroethyl) phosphate.

5. The composition of claim 1 in which the amount of halogen alkyl phosphate is about 25 to 50 weight percent based on the urethane and halogen alkyl phosphate and the amount of alkylene diamine tetra-acetic acid is about 25 to 50 weight percent based on the urethane and alkylene diamine tetra-acetic acid.

6. The composition of claim 5 in which the halogen lower alkyl is monochloroalkyl of 2 to 3 carbon atoms.

7. The composition of claim 5 in which the urethane is a tolylene diisocyanate-polyol urethane, the alkylene diamine tetra-acetic acid is ethylene diamine tetra-acetic acid and the phosphate is tris (chloroethyl) phosphate.

8. The composition of claim 1 in which the urethane is a tolylene diisocyanate-polyol urethane.

9. The composition of claim 7 in which the urethane is a tolylene diisocyanate-aliphatic polyol urethane.

10. The composition of claim 3 in which the urethane is a tolylene diisocyanate-aliphatic polyol urethane.

11. The composition of claim 1 in which the urethane is an aromatic diisocyanate-aliphatic polyol urethane.

References Cited

UNITED STATES PATENTS

| | | | |
|---|---|---|---|
| 3,004,073 | 10/1961 | Wismer | 260—613 |
| 3,171,819 | 3/1965 | Powanda | 260—2.5 |
| 3,235,517 | 2/1966 | Beck | 260—2.5 |
| 3,264,233 | 8/1966 | Trescher | 260—2.5 |
| 3,265,681 | 8/1966 | Friedman | 260—953 |
| 3,284,404 | 11/1966 | Schollenberger | 260—45.85 |

DONALD E. CZAJA, *Primary Examiner.*

H. E. TAYLOR, JR., *Assistant Examiner.*

U.S. Cl. X.R.

106—15; 260—45.7, 47, 77.5

PO-1050
(5/69)

UNITED STATES PATENT OFFICE
CERTIFICATE OF CORRECTION

Patent No. 3,448,075          Dated    June 3, 1969

Inventor(s) Charles C. Clark and Arthur J. Krawczyk

It is certified that error appears in the above-identified patent and that said Letters Patent are hereby corrected as shown below:

Column 3, line 27 should read --in which X is halogen having an atomic number from 17--.

Column 4, line 46, after the formula, insert a --semicolon--.

Column 4, line 50, after the formula, insert a --semicolon--.

Column 4, line 54, the formula should read
--($HOCH_2-P(O)[(OCH_2CH_2)_3OH]_2$);--.

Column 4, line 74, after the formula, insert a --period--.

Column 6, line 23, cancel the word "the".

Column 7, line 7, after the word "ethyl" insert a --parenthesis-- and cancel the one before the word "phosphate".

Column 8, line 2, "eight" should be --eighty--.

Column 10, line 32, "shows" should be --show--.

Column 10, line 36, at the end of the line, cancel the "period".

Column 10, line 75, "the" should be --this--.

SIGNED AND SEALED
MAR 10 1970

(SEAL)
Attest:

Edward M. Fletcher, Jr.
Attesting Officer

WILLIAM E. SCHUYLER, JR.
Commissioner of Patents